(12) United States Patent
Tsutsumi et al.

(10) Patent No.: US 10,808,102 B2
(45) Date of Patent: Oct. 20, 2020

(54) THERMOSETTING EPOXY RESIN SHEET FOR ENCAPSULATING SEMICONDUCTOR, SEMICONDUCTOR EQUIPMENT, AND METHOD FOR MANUFACTURING THE SAME

(71) Applicant: SHIN-ETSU CHEMICAL CO., LTD., Tokyo (JP)

(72) Inventors: Yoshihiro Tsutsumi, Annaka (JP); Shuichi Fujii, Maebashi (JP); Kenji Hagiwara, Annaka (JP); Kazuaki Sumita, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/027,024

(22) Filed: Jul. 3, 2018

(65) Prior Publication Data

US 2019/0055377 A1 Feb. 21, 2019

(30) Foreign Application Priority Data

Aug. 16, 2017 (JP) .................................. 2017-157164

(51) Int. Cl.
| | | |
|---|---|---|
| *C08K 5/13* | (2006.01) | |
| *C08L 63/00* | (2006.01) | |
| *C08K 5/00* | (2006.01) | |
| *C08K 5/21* | (2006.01) | |
| *C08K 3/013* | (2018.01) | |
| *C08G 59/68* | (2006.01) | |
| *C08G 59/40* | (2006.01) | |
| *C08G 59/24* | (2006.01) | |
| *C08K 3/36* | (2006.01) | |

(52) U.S. Cl.
CPC .............. *C08K 5/13* (2013.01); *C08G 59/245* (2013.01); *C08G 59/4021* (2013.01); *C08G 59/686* (2013.01); *C08K 3/013* (2018.01); *C08K 5/0025* (2013.01); *C08K 5/21* (2013.01); *C08L 63/00* (2013.01); *C08K 3/36* (2013.01); *C08L 2203/206* (2013.01)

(58) Field of Classification Search
None
See application file for complete search history.

(56) References Cited

U.S. PATENT DOCUMENTS

| | | | |
|---|---|---|---|
| 2008/0128922 A1* | 6/2008 | Kotani | C08G 59/621 257/793 |
| 2016/0244590 A1* | 8/2016 | Takada | C08K 3/346 |
| 2017/0369629 A1* | 12/2017 | Mashima | C08G 18/58 |

FOREIGN PATENT DOCUMENTS

| | | |
|---|---|---|
| JP | H08-073621 A | 3/1996 |
| JP | 2006-216899 A | 8/2006 |
| JP | 2016-009814 A | 1/2016 |
| JP | 2016-108387 A | 6/2016 |
| JP | 2016-108388 A | 6/2016 |
| JP | 2016-213391 A | 12/2016 |
| WO | 2016/125350 A1 | 8/2016 |

OTHER PUBLICATIONS

Aug. 4, 2020 Office Action issued in Japanese Patent Application No. 2017-157164.

* cited by examiner

*Primary Examiner* — Robert T Butcher
(74) *Attorney, Agent, or Firm* — Oliff PLC

(57) ABSTRACT

The present invention is a thermosetting epoxy resin sheet for encapsulating a semiconductor, characterized by being a sheet formed from a composition including: (A) a crystalline bisphenol A type epoxy resin and/or a crystalline bisphenol F type epoxy resin, (B) an epoxy resin that is non-fluid at 25° C. other than the component (A), (C) a phenol compound having two or more phenolic hydroxy groups in a molecule thereof, (D) an inorganic filler, and (E) an urea-based curing accelerator. The present invention provides a thermosetting epoxy resin sheet for encapsulating a semiconductor that has excellent flexibility and good handleability in an uncured state, together with excellent storage stability and formability.

5 Claims, 1 Drawing Sheet

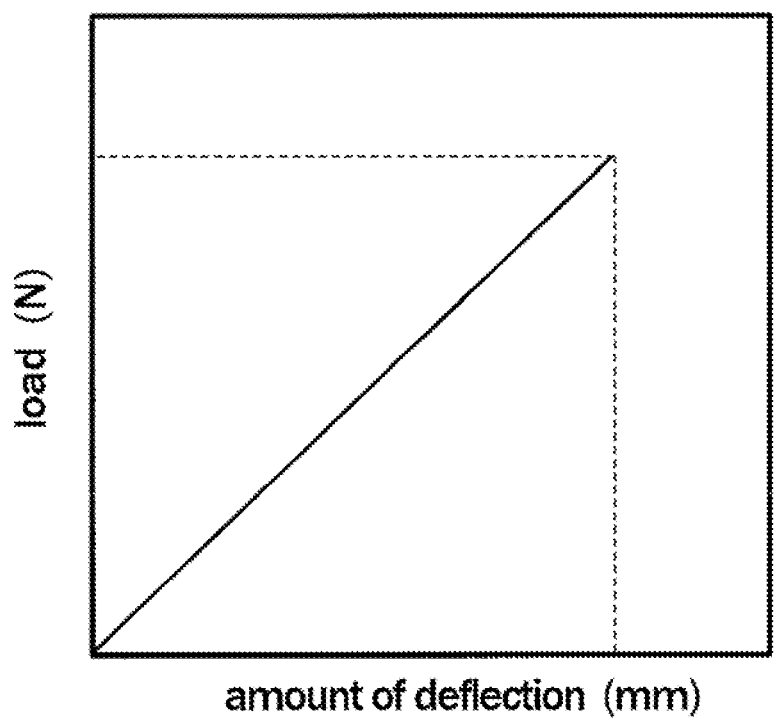

THERMOSETTING EPOXY RESIN SHEET FOR ENCAPSULATING SEMICONDUCTOR, SEMICONDUCTOR EQUIPMENT, AND METHOD FOR MANUFACTURING THE SAME

TECHNICAL FIELD

The present invention relates to a thermosetting epoxy resin sheet for encapsulating a semiconductor and a semiconductor equipment using the same.

BACKGROUND ART

Electronic parts used for electronic appliances include a semiconductor package obtained by encapsulating a semiconductor device with a resin. Previously, this semiconductor package has been usually manufactured by transfer molding of an epoxy resin composition in the form of a tablet. On the other hand, electronic parts have been required to be mounted on a circuit board in higher density due to miniaturization and weight reduction of electronic appliances in recent years. Accordingly, semiconductor packages also have been miniaturized and reduced in thickness and weight.

Specifically, semiconductor packages such as a Chip Size Package (CSP) and a Ball Grid Array (BGA) have been developed, which are miniaturized and reduced in weight. In recent years, there also have been developments of a wafer level CSP and a so-called flip chip of a face down type package, in which a semiconductor device is mounted on a circuit board with the circuit face being faced to the circuit board.

With these developments for thinning semiconductor packages, there arises a case in which conventional transfer molding fails to cope with. Additionally, other molding methods in place of transfer molding have been investigated to improve the productivity by increasing the number of products taken. Molding performed on a large size substrate for increasing the number of products taken, for example, is liable to cause a problem of warpage, and tends to increase the content of inorganic fillers in the encapsulant to mend the warpage. Such a highly loaded inorganic filler makes melting viscosity of a resin high to lower the filling property in transfer molding. As a result, the molded article causes lowering of the quality such as a short shot, residual of voids in the molded article, a wire sweep (deformation or breakage of bonding wire), and increase of die shift.

Accordingly, applications of compression molding have been investigated as an encapsulation method in place of transfer molding, including various encapsulation materials in a sheet-form (Patent Literatures 1, 2), not only in a liquid-form. These encapsulation materials in a sheet-form, however, use conventional epoxy resins and phenolic curing agents, and is lacking in flexibility to cause breakage or chipping easily in an uncured or semi-cured state even in a sheet form, thereby having a problem of handleability.

To solve these problems, a sheet material containing a styrene-isobutylene base thermoplastic resin is reported. However, this styrene-isobutylene base thermoplastic resin is hard to be melted and mixed by heating and is liable to separate, thereby having problems that the sheet production is difficult and that the intended effects are less obtainable (Patent Literature 3). Addition of flexibilizer, which improves crack resistance of a cured material, is ineffective for adding flexibility to the sheet (Patent Literatures 4, 5).

To solve these problems, a composition featuring flexibility is reported in which the flexibility is largely improved by using a biphenyl type epoxy resin, which is a crystalline epoxy resin (Patent Literature 6). On the other hand, sheet materials are required to have longer working life and higher storage stability because of limitation of molding time. When an accelerator is simply decreased, the curability is lowered although the storage stability becomes excellent. Accordingly, sheet materials are required to have both of these, and the above composition is insufficient as a sheet material that has both of these properties.

CITATION LIST

Patent Literature

PATENT LITERATURE 1: Japanese Patent Laid-Open Publication No. H08-73621
PATENT LITERATURE 2: Japanese Patent Laid-Open Publication No. 2006-216899
PATENT LITERATURE 3: Japanese Patent Laid-Open Publication No. 2016-213391
PATENT LITERATURE 4: Japanese Patent Laid-Open Publication No. 2016-108387
PATENT LITERATURE 5: Japanese Patent Laid-Open Publication No. 2016-108388
PATENT LITERATURE 6: Japanese Patent Laid-Open Publication No. 2016-9814

SUMMARY OF THE INVENTION

Technical Problem

The present invention was accomplished to solve the above problems. It is an object of the present invention to provide a thermosetting epoxy resin sheet for encapsulating a semiconductor that has excellent flexibility and good handleability even in an uncured state, together with excellent storage stability and formability.

Solution to Problem

To accomplish the object, the present invention provides a thermosetting epoxy resin sheet for encapsulating a semiconductor, characterized by being a sheet formed from a composition comprising:

(A) a crystalline bisphenol A type epoxy resin and/or a crystalline bisphenol F type epoxy resin,
(B) an epoxy resin that is non-fluid at 25° C. other than the component (A),
(C) a phenol compound having two or more phenolic hydroxy groups in a molecule thereof,
(D) an inorganic filler, and
(E) an urea-based curing accelerator.

The thermosetting epoxy resin sheet for encapsulating a semiconductor like this attains excellent flexibility and good handleability in an uncured state, together with excellent storage stability and formability.

It is preferable that the component (A) be contained in an amount of 10 to 25 parts by mass relative to 100 parts by mass of the total amount of the components (A), (B), and (C); and the component (E) be contained in an amount of 0.05 to 6 parts by mass relative to 100 parts by mass of the total amount of the components (A), (B), and (C).

The component (A) contained in the amount like this brings sufficient flexibility without causing risks of increasing of tackiness, lowering of ability for holding the sheet, and excess lowering of glass transition temperature of a resin composing a sheet. The component (E) contained in the amount like this eliminates risks that the cured material of the composition loses the balance between heat resistance and humidity resistance and that the curing rate at molding becomes extremely lower or higher.

It is preferable that the component (D) be contained in an amount of 80 to 92 parts by mass relative to 100 parts by mass of the composition.

The component (D) contained in the amount like this is capable of giving sufficient strength to the thermosetting epoxy resin sheet for encapsulating a semiconductor without causing risk of short shot due to increased viscosity or delamination in a semiconductor equipment due to the loss of flexibility.

It is preferable that the component (E) be shown by the following general formula (1), $$R^1NHCONR^2R^3 \quad (1)$$

wherein $R^1$ represents a hydrogen atom or a group selected from an alkyl group having 1 to 18 carbon atoms and an aromatic hydrocarbon group having 6 to 18 carbon atoms, and $R^2$ and $R^3$ each represent an alkyl group having 1 to 6 carbon atoms.

It is possible to attain the storage stability and the curability in better balance by containing the component (E) like this.

It is preferable that the component (D) contain a silica.

It is possible to obtain a cured material with reduced warpage while attaining excellent reinforcing effect by containing the component (D) like this.

It is preferable that the thermosetting epoxy resin sheet for encapsulating a semiconductor have an amount of deflection of 30 mm or more in a three-point bending test in the uncured state.

The thermosetting epoxy resin sheet for encapsulating a semiconductor like this more securely makes it possible to attain excellent flexibility and good handleability in an uncured state.

The present invention also provides a semiconductor equipment, comprising a semiconductor device encapsulated with the thermosetting epoxy resin sheet for encapsulating a semiconductor described above.

In the semiconductor equipment like this, the semiconductor device is favorably encapsulated without causing a void, a wire sweep, and a die shift.

The present invention also provides a method for manufacturing a semiconductor equipment, comprising encapsulation of a semiconductor device by using the thermosetting epoxy resin sheet for encapsulating a semiconductor described above.

In the method for manufacturing a semiconductor equipment like this, the sheet is allowed to be softened or melted by heating at a temperature no more than the curing temperature of the thermosetting epoxy resin sheet for encapsulating a semiconductor described above to encapsulate a semiconductor device in accordance with the shape thereof.

In the method for manufacturing a semiconductor equipment described above, it is preferable that the encapsulation of a semiconductor device be performed under pressure and/or under reduced pressure by softening or melting the thermosetting epoxy resin sheet while heating the same.

In the method for manufacturing a semiconductor equipment like this, the thermosetting epoxy resin sheet for encapsulating a semiconductor described above, which has been softened or melted to follow the shape of the semiconductor device, is allowed to adhere to the semiconductor device more closely.

Advantageous Effects of Invention

As described above, the inventive thermosetting epoxy resin sheet for encapsulating a semiconductor attains excellent flexibility and good handleability in an uncured state, together with excellent storage stability and formability. The inventive semiconductor equipment, in which a semiconductor device is encapsulated with the inventive thermosetting epoxy resin sheet for encapsulating a semiconductor like this, is a semiconductor equipment in which the semiconductor device is favorably encapsulated without causing a void, a wire sweep, and a die shift. In the inventive method for manufacturing a semiconductor equipment using the inventive thermosetting epoxy resin sheet for encapsulating a semiconductor, the sheet is allowed to be softened or melted by heating at a temperature no more than the curing temperature of the thermosetting epoxy resin sheet for encapsulating a semiconductor to encapsulate a semiconductor device in accordance with the shape thereof, and to adhere to the semiconductor device more closely.

BRIEF DESCRIPTION OF DRAWING

The FIGURE shows an example of load-deflection curve used for measuring an amount of deflection of a sheet.

DESCRIPTION OF EMBODIMENTS

As described above, it has been desired to develop a thermosetting epoxy resin sheet for encapsulating a semiconductor that has excellent flexibility and good handleability in an uncured state, together with excellent storage stability and formability.

The present inventors have diligently investigated to solve the above problems and found that the above problems can be solved with a thermosetting epoxy resin sheet made from a composition that contains a particular combination of an epoxy resin and an urea-based curing accelerator; thereby bringing the present invention to completion.

That is, the present invention is a thermosetting epoxy resin sheet for encapsulating a semiconductor that is a sheet-form material formed from a composition comprising:

(A) a crystalline bisphenol A type epoxy resin and/or a crystalline bisphenol F type epoxy resin, (B) an epoxy resin that is non-fluid at 25° C. other than the component (A), (C) a phenol compound having two or more phenolic hydroxy groups in a molecule thereof, (D) an inorganic filler, and (E) an urea-based curing accelerator.

Hereinafter, the inventive thermosetting epoxy resin sheet for encapsulating a semiconductor and the inventive semiconductor equipment will be specifically described, but the present invention is not limited thereto.

[Thermosetting Epoxy Resin Sheet for Encapsulating a Semiconductor]

The inventive thermosetting epoxy resin sheet for encapsulating a semiconductor is a sheet material formed from the composition containing the components (A) to (E) described above. Hereinafter, each component will be described more specifically.

<Component (A)>

The component (A) used for the present invention is a crystalline bisphenol A type epoxy resin and/or a crystalline bisphenol F type epoxy resin. The use of the component (A) like this enables the composition to form a sheet with flexibility when it is formed into a sheet-form and to have favorable formability even when it is highly loaded with an inorganic filler, which is the component (D) described later. As the component (A), any crystalline bisphenol A type epoxy resin and any crystalline bisphenol F type epoxy resin can be used regardless of the molecular weight and so on, but is preferably a bisphenol A type epoxy resin.

As the component (A), commercially available articles such as YL-6810 (manufactured by Mitsubishi Chemical Corporation), YSLV-70XY and YSLV-80XY (both manufactured by NIPPON STEEL & SUMIKIN CHEMICAL CO., LTD.) are usable.

The content of the component (A) is preferably 10 to 25 parts by mass, more preferably 12 to 22 parts by mass, and still more preferably 14 to 20 parts by mass relative to 100 parts by mass of the total amount of the component (A), an epoxy resin that is non-fluid at 25° C. other than the component (A), which is the component: (B), and a phenol compound having two or more phenolic hydroxy groups in a molecule thereof, which is the component (C). When the content is 10 parts by mass or more, the composition is allowed to give sufficient flexibility to the sheet obtained by forming the same. When the content is 25 parts by mass or less, the sheet is prevented from having excess tackiness, lowering of ability for holding the sheet, and excess lowering of glass transition temperature of a resin composing a sheet, while keeping the sufficient flexibility.

<Component (B)>

The component (B) used for the present invention is an epoxy resin that is non-fluid at 25° C. other than the component (A). The use of an epoxy resin that is fluidal at 25° C. gives a sheet that lacks in handleability such that the tackiness and adhesiveness are large, and the sheet is difficult to delaminate from a release film. Accordingly, an epoxy resin that is non-fluid at 25° C. is used for the present invention.

Illustrative examples of the epoxy resin of the component (B) includes non-crystalline bisphenol A type epoxy resins and non-crystalline bisphenol F type epoxy resins that are solid at 25° C.; biphenyl type epoxy resins such as 3,3',5,5'-tetramethyl-4,4'-biphenol type epoxy resins and 4,4'-biphenol type epoxy resins; phenol novolak type epoxy resins, cresol novolak type epoxy resins, bisphenol A novolak type epoxy resins, naphthalenediol type epoxy resins, trisphenylolmethane type epoxy resins, tetrakisphenylolethane type epoxy resins, and phenoldicyclopentadiene novolak type epoxy resins, the aromatic ring (s) of which is hydrogenated; alicyclic epoxy resins, and triazine derivative epoxy resins. Among them, preferable ones include an epoxy resin that has a softening point measured by ring and ball method described in JIS K 7234:1986 or a melting point measured by differential scanning calorimetry (DSC) in a range of 50 to 120° C. in view of improving the handleability of a sheet such as tackiness.

<Component (C)>

The component (C) used for the present invention is a phenol compound having two or more phenolic hydroxy groups in one molecule. This component (C) is used as a curing agent for the component (A) and the component (B), and any commonly known ones can be used as long as having two or more, preferably three or more phenolic hydroxy groups in one molecule. Illustrative examples of the component (C) like this includes phenol novolak resins, cresol novolak resins, phenolaralkyl resins, naphtholaralkyl resins, terpene-modified phenolic resins, and dicyclopentadiene-modified phenolic resins. They can be used as a single substance or a mixture of two or more kinds. Any of these phenolic resins can be used regardless of the molecular weight, the softening point, and the amount of hydroxy groups, but preferably has a low softening point and relatively low viscosity.

The content of the component (C) is preferably an amount by which the equivalent ratio of phenolic hydroxy group in the component (C) is 0.5 to 2.0, more preferably 0.7 to 1.5 relative to the epoxy group in the component (A) and the component (B). When the amount is 0.5 or more and 2.0 or less in equivalent ratio, the sheet is prevented from the risks of lowering the curability and mechanical properties.

<Component (D)>

The component (D) used for the present invention is an inorganic filler. This component (D) is loaded to increase the strength of a cured material of the inventive thermosetting epoxy resin sheet for encapsulating a semiconductor. As the component (D) like this, it is possible to use any filler conventionally loaded to an epoxy resin composition or a silicone resin composition, including silicas such as a spherical silica, a fused silica, and a crystalline silica; inorganic nitrides such as silicon nitride, aluminum nitride, and boron nitride; alumina, glass fibers, and glass particles. The component (D) preferably contains a silica in view of the excellent reinforcing effect and the ability of reducing the warpage of an obtained cured material.

The average particle size and the shape of the component (D) are not particularly limited. The average particle size is, however, preferably 0.5 to 40 μm, more preferably 3 to 40 m. As the component (D), a spherical silica with the average particle size of 0.5 to 40 μm is preferably used. Incidentally, the average particle size in the present invention is a value determined as a mass average particle size $D_{50}$ (or median diameter) in particle size distribution measurement using laser diffractometry.

In view of increasing the fluidity of the epoxy resin composition composing the sheet, inorganic fillers with different particle size ranges can be combined as the component (D) to be used for producing the inventive thermosetting epoxy resin sheet for encapsulating a semiconductor. In this case, it is preferable to use the combination of spherical silicas in a fine particle size range of 0.1 to 3 μm, in a middle particle size range of 3 to 7 μm, and in a coarse particle size range of 10 to 40 μm. For further increasing the fluidity, it is preferable to use a spherical silica having still larger average particle size.

In encapsulation of a semiconductor device with a thermosetting epoxy resin sheet for encapsulating a semiconductor, on the other hand, compression molding and laminate molding are mainly used as the formation method, and mold underfill (MUF) property has been increasingly demanded. In view of improving the MUF property, the present invention preferably uses a spherical silica with the average particle size of 2 to 6 μm and the top cut size of 10 to 20 μm.

Additionally, the component (D) may be previously subjected to surface treatment with a coupling agent, which is the component (I) described later, to increase the bonding strength thereof to the resin components (A), (B), and (C). The coupling agent may be a silane coupling agent, a titanate coupling agent, etc., but the use of a silane coupling agent is preferable.

The content of the component (D) is preferably 80 to 92 parts by mass, more preferably 83 to 91 parts by mass relative to 100 parts by mass of the composition. When the content is 80 parts by mass or more, the thermosetting epoxy resin sheet for encapsulating a semiconductor is allowed to have sufficient strength. When the content is 92 parts by mass or less, the thermosetting epoxy resin sheet is prevented from the risks of causing short shot due to thickness increase and peeling in a semiconductor equipment due to the loss of flexibility.

<Component (E)>

The component (E) used for the present invention is an urea-based curing accelerator. This component (E) is blended to accelerate the curing reaction of the epoxy resins of the components (A) and (B) and the curing agent of the component (C). The use of the component (E) like this enables the inventive thermosetting epoxy resin sheet for encapsulating a semiconductor to be firmly cured in encapsulation forming not to be uncured while improving the storage stability. That is, the component (E) makes it possible to attain excellent formability.

The component (E) is preferably the one shown by the following general formula (1),

$$R^1NHCONR^2R^3 \quad (1)$$

wherein $R^1$ represents a hydrogen atom or a group selected from an alkyl group having 1 to 18 carbon atoms and an aromatic hydrocarbon group having 6 to 18 carbon atoms, and $R^2$ and $R^3$ each represent an alkyl group having 1 to 6 carbon atoms.

In the formula, $R^1$ represents a hydrogen atom or a group selected from an alkyl group having 1 to 18, preferably 3 to 15 carbon atoms, and an aromatic hydrocarbon group having 6 to 18, preferably 6 to 15 carbon atoms; and $R^2$ and $R^3$ each independently represent an alkyl group having 1 to 6 carbon atoms. $R^2$ and $R^3$ are preferably methyl groups in view of the storage stability and curability.

Illustrative examples of the urea-based curing accelerator shown by the general formula (1) include 1,1-dimethylurea, 1,1,3-trimethylurea, 1,1-dimethyl-3-ethylurea, 1,1-dimethyl-3-phenylurea, 1,1-diethyl-3-methylurea, 1,1-diethyl-3-phenylurea, 1,1-dimethyl-3-(3,4-dimethylphenyl)urea, 1,1-dimethyl-3-(p-chlorophenyl)urea, and 3-(3,4-dichlorophenyl)-1,1-dimethylurea (DCMU).

The content of the component (E) is preferably 0.05 to 6 parts by mass, particularly 0.1 to 5 parts by mass relative to 100 parts by mass of the total amount of the components (A), (B), and (C). When the content is 0.05 to 6 parts by mass, the composition is prevented from the risk that the cured material upsets the balance between the heat resistance and the humidity resistance or that the curing rate in forming becomes extremely late or extremely fast.

In the composition to be a material for the inventive thermosetting epoxy resin sheet for encapsulating a semiconductor, the following optional component(s) can be blended in addition to the components (A) to (E).

<Component (F)>

In the composition to be a material for the inventive thermosetting epoxy resin sheet for encapsulating a semiconductor, a curing accelerator other than the component (i) (i.e., other than the urea-based curing accelerator) can be blended as a component (F) in addition to the component (E) described above. As the component (F) like this, any curing accelerator conventionally used for an epoxy resin can be used, including amine compounds such as 1,8-diazabicyclo (5.4.0)undec-7-ene; organic phosphorus compounds such as triphenyl phosphine and tetraphenylphosphonium tetraborate salt; and imidazole compounds such as 2-methylimidazole.

<Component (G)>

In the composition to be a material for the inventive thermosetting epoxy resin sheet for encapsulating a semiconductor, a releasing agent can be blended as a component (G). This component (G) is blended to improve the releasability in forming. Illustrative examples of the component (G) like this include natural waxes such as carnauba wax and rice wax; and synthetic waxes such as acid wax, polyethylene wax, and fatty acid ester, preferably carnauba wax in view of the releasability.

The content of the component (G) is preferably 0.05 to 5.0 parts by mass, particularly 0.4 to 3.0 parts by mass relative to 100 parts by mass of the total amount of the components (A), (B), and (C). When the content is 0.05 parts by mass or more, the composition is prevented from the risks of insufficient releasability and overload in melt blending in production thereof. When the content is 5.0 parts by mass or less, the composition is prevented from the risks of bleeding failure and adhesion failure.

<Component (H)>

In the composition to be a material for the inventive thermosetting epoxy resin sheet for encapsulating a semiconductor, a flame-retardant can be blended as a component (H). This component (H) is blended to improve the flame resistance of the thermosetting epoxy resin sheet for encapsulating a semiconductor. As the component (H) like this, any known one can be used without being particularly limited, including phosphazene compounds, silicone compounds, zinc molybdate supported with talc, zinc molybdate supported with zinc oxide, aluminum hydroxide, magnesium hydroxide, molybdenum oxide, and antimony trioxide. They may be used alone or in a combination of two or more kinds.

The content of the component (H) is preferably 2 to 20 parts by mass, particularly 3 to 10 parts by mass relative to 100 parts by mass of the total amount of the components (A), (B), and (C).

<Component (I)>

In the composition to be a material for the inventive thermosetting epoxy resin sheet for encapsulating a semiconductor, a coupling agent such as a silane coupling agent and a titanate coupling agent can be blended as a component (I). This component (I) is blended to increase the bonding strength of the resin components of the components (A), (B), and (C) with inorganic filler, which is the component (D), or to improve the adhesiveness to a silicon wafer or an organic substrate. Illustrative examples of the component (I) like this include epoxy functional alkoxysilanes such as γ-glycidoxypropyltrimethoxysilane, γ-glycidoxypropylmethyldiethoxysilane, and β-(3,4-epoxycyclohexyl)ethyltrimethoxysilane; mercapto functional alkoxysilanes such as γ-mercaptopropyltrimethoxysilane; amine functional alkoxysilanes such as γ-aminopropyltrimethoxysilane and N-2-(aminoethyl)-3-aminopropyltrimethoxysilane; and amino functional alkoxysilanes such as N-β-(aminoethyl)-γ-aminopropyltrimethoxysilane, γ-aminopropyltriethoxysilane, and N-phenyl-γ-aminopropyltrimethoxysilane.

The surface treatment may be performed by conventional way, and the method of surface treatment and the blending amount of the coupling agent used therein are not particularly limited. As described above, it is possible to treat the inorganic filler with the coupling agent previously, and it is also possible to perform surface treatment by adding the coupling agent while mixing the composition when the inorganic fillers of the component (D) is mixed with the resin components of the components (A), (B), and (C).

The content of the component (I) is preferably 0.1 to 8.0 parts by mass, particularly 0.5 to 6.0 parts by mass relative to 100 parts by mass of the total amount of the components (A), (B), and (C). When the content is 0.1 parts by mass or more, the effect of adhesion to a substrate becomes sufficient. When the content is 8.0 parts by mass or less, the composition is prevented from extremely lowering of the viscosity to cause voids.

<Other Additives>

To the inventive thermosetting epoxy resin sheet for encapsulating a semiconductor, various additives can also be blended in accordance with needs. It is possible to add or blend an additive(s) such as organopolysiloxane, silicone oil, thermoplastic resin, thermoplastic elastomer, organic synthetic rubber, and light stabilizer to improve the properties of resin; an ion trapping agent to improve the electric properties; and pigments such as carbon black in view of coloring.

<Method for Manufacturing the Thermosetting Epoxy Resin Sheet for Encapsulating a Semiconductor>

The method for manufacturing the inventive thermosetting epoxy resin sheet for encapsulating a semiconductor includes a T-die extrusion method, in which epoxy resins of the components (A) and (B), a phenol compounds of the component (C), an inorganic filler of the component (D), an urea-based curing accelerator of the component (E), and other additives described above are blended in a prescribed composition ratio, and this is mixed sufficiently homogeneously with a mixer and so on, followed by sheet-forming by using a twin-screw extruder in which a T-die is installed to the tip. Alternatively, it can be obtained by sheet-forming in which melt mixing treatment is performed with a heat roll, a kneader, or an extruder, followed by cooling to solidify and grinding the mixture into appropriate size, and the obtained ground product of the thermosetting epoxy resin composition is heated to 70 to 120° C. between pressure members, thereby being melted and compressed.

The thermosetting epoxy resin sheet for encapsulating a semiconductor thus obtained preferably has a thickness of 0.1 to 5.0 mm, more preferably 0.15 to 3.0 mm.

The inventive thermosetting epoxy resin sheet for encapsulating a semiconductor thus obtained preferably has an amount of deflection of 30 mm or more, more preferably 40 to 100 mm in a three-point bending test in the uncured state of this sheet. Incidentally, the three-point bending test in the present invention is performed by applying the method for measuring bending strength described in JIS K 6911:2006. Specifically, the amount of deflection is determined from load-deflection curve measured under the conditions of using a test piece with the length of 100 mm, the height of 1.0 mm, and the width of 10 mm as the test piece; loading at a loading speed of 2 mm/min; and other conditions described in the specification of the standard.

[Semiconductor Equipment]

The present invention also provides a semiconductor equipment in which a semiconductor device is encapsulated with the inventive thermosetting epoxy resin sheet for encapsulating a semiconductor described above.

The inventive semiconductor equipment can be manufactured by encapsulating a semiconductor device with the inventive thermosetting epoxy resin sheet for encapsulating a semiconductor described above by compression molding or laminate molding. The compression molding can be performed, for example, by using a compression molding machine at a molding temperature of 120 to 190° C. for a molding time of 30 to 600 seconds, preferably at a molding temperature of 130 to 160° C. for a molding time of 120 to 450 seconds. In any molding method, post-curing may be performed at 140 to 185° C. for 0.5 to 20 hours.

Alternatively, encapsulation of a semiconductor device can be performed in such a way that the inventive thermosetting epoxy resin sheet for encapsulating a semiconductor is placed on a substrate on which the semiconductor device is mounted, and is melted to follow the substrate on a hot plate with a temperature of 60 to 150° C. for 30 to 240 minutes.

In the semiconductor equipment like this, the semiconductor device is favorably encapsulated without causing a void, a wire sweep, and a die shift.

[Method for Manufacturing a Semiconductor Equipment]

The present invention also provides a method for manufacturing a semiconductor equipment in which a semiconductor device is encapsulated by using the thermosetting epoxy resin sheet for encapsulating a semiconductor described above.

In the method for manufacturing a semiconductor equipment like this, the sheet is allowed to be softened or melted by heating at a temperature no more than the curing temperature of the thermosetting epoxy resin sheet for encapsulating a semiconductor described above to encapsulate a semiconductor device in accordance with the shape thereof. Specifically, the encapsulation of a semiconductor device is preferably performed in such a way that the inventive thermosetting epoxy resin sheet for encapsulating a semiconductor is placed on a substrate on which the semiconductor device is mounted, and is melted to be fitted to the substrate and the device on a hot plate with a temperature of 60 to 150° C. for 30 to 240 minutes.

In the method for manufacturing a semiconductor equipment described above, the encapsulation of a semiconductor device is preferably performed under pressure and/or under reduced pressure by softening or melting the sheet while heating the same. By the method for manufacturing a semiconductor equipment like this, encapsulation of a semiconductor is allowed to reduce void occurrence, to improve fitting and penetrating properties into fine parts, and to further improve the adhesion between the semiconductor device and the thermosetting epoxy resin sheet for encapsulating a semiconductor described above. When the encapsulation is performed under pressure, the encapsulation pressure is preferably 0.2 MPa or more. When the encapsulation is performed under reduced pressure, the encapsulation pressure is preferably 0.05 MPa or less.

EXAMPLES

Hereinafter, the present invention will be specifically described by showing Examples and Comparative Examples, but the present invention is not limited to the following Examples.

The raw materials used in Examples and Comparative Examples are as follows.

(A) Crystalline bisphenol A type epoxy resin and/or crystalline bisphenol F type epoxy resin (A-1): crystalline bisphenol A type epoxy resin (YL-6810: trade name, manufactured by Mitsubishi Chemical Corporation, epoxy equivalent: 170)

(B) Epoxy resin that is non-fluid at 25° C. other than the component (A)

(B-1): solid bisphenol A type epoxy resin (jER-1001: trade name, manufactured by Mitsubishi Chemical Corporation, epoxy equivalent: 475, softening point: 64° C.)

(B-2): cresol novolak type epoxy resin (EPICLON N-670: trade name, manufactured by DIC CORPORATION, epoxy equivalent: 210, melting point: 73° C.)
(B-3): biphenyl type epoxy resin (YX-4000: trade name, manufactured by Mitsubishi Chemical Corporation, epoxy equivalent: 1.86, melting point: 105° C.)
(B-4): trisphenolmethane type epoxy resin (EPPN-501: trade name, manufactured by Nippon Kayaku Co., Ltd., epoxy equivalent: 166, softening point: 54° C.)
(C) Phenol compound having two or more phenolic hydroxy groups in one molecule
(C-1): trisphenolmethane type phenolic resin (MEH-7500: trade name, manufactured by MEIWA PLASTIC INDUSTRIES, LTD., hydroxy equivalent: 97)
(C-2): phenol novolak type phenolic curing agent (TD-2131: trade name, manufactured by DIC CORPORATION, hydroxy equivalent: 110)
(D) inorganic filler
(D-1): spherical fused silica (CS-6103 53C2: trade name, manufactured by TATSUMORI LTD., average particle size: 10 μm)
(E) Urea-based curing accelerator
(E-1): aromatic dimethylurea (U-CAT 3512T: trade name, manufactured by San-Apro Ltd.)
(E-2): aliphatic dimethylurea (U-CAT 3513N: trade name, manufactured by San-Apro Ltd.)
(F) Curing accelerator other than urea-based one
(F-1): 2-methyl-4-ethylimidazole (2E4MZ, manufactured by SHIKOKU CHEMICALS CORPORATION)
(F-2): triphenyl phosphine (TPP, HOKKO CHEMICAL INDUSTRY CO., LTD.)
(G) Releasing agent
(G-1): carnauba wax (TOWAX-131: trade name, manufactured by TOA KASEI CO., LTD.)
(H) Flame-retardant
(H-1): zinc molybdate supported with zinc oxide (KEMGARD 911C: trade name, manufactured by Sherwin-Williams Company)
(I) Coupling agent
(I-1): silane coupling agent: 3-mercaptopropyltrimethoxysilane (KBM-803: trade name, manufactured by Shin-Etsu Chemical Co., Ltd.)
(J) Colorant
(J-1): carbon black (Mitsubishi carbon black #3230MJ: trade name, manufactured by Mitsubishi Chemical Corporation)

Examples 1 to 8, Comparative Examples 1 to 8

In each of the formulations shown in Table 1 and Table 2, a composition was previously prepared by pre-mixing with a Henschel mixer. Then, each composition was formed to have a width of 300 mm and a thickness of 0.5 mm by using a twin-screw extruder in which a T-die had been installed to form a thermosetting epoxy resin sheet for encapsulating a semiconductor.

<Test for Minimum Melt Viscosity and Storage Stability>

The minimum melt viscosity of each thermosetting epoxy resin sheet for encapsulating a semiconductor was measured by using a Koka-type flow tester (flow tester CFT-500 type: trade name, manufactured by SHIMADU CORPORATION) with a nozzle having a diameter of 1 mm under pressure of 25 kgf at a temperature of 175° C. Additionally, each thermosetting epoxy resin sheet for encapsulating a semiconductor was introduced to a thermostat chamber set to 40° C. and was left for 72 hours, and the minimum melt viscosity thereof was also measured under the same conditions. The results are shown in Table 1 and Table 2.

<Amount of Deflection of a Sheet>

A thermosetting epoxy resin sheet for encapsulating a semiconductor in an uncured state was produced, with the length being 100 mm, the width being 10 mm, and the thickness being 1.0 mm. This seat was subjected to a three-point bending test in which the sheet was pressed at room temperature (25° C.) and a loading speed of 2 mm/min in accordance with the specification of JIS K 6911:2006 to give a load-deflection curve as shown in the FIGURE. From this load-deflection curve, an amount of deflection was measured. The results are shown in Table 1 and Table 2.

<Formability of a Sheet>

A thermosetting epoxy resin sheet for encapsulating a semiconductor produced by T-die extrusion method to have a thickness of 0.5 mm was cut into a piece with the diameter of 150 mm (6 inches). This was set on a silicon wafer with the diameter of 200 mm (8 inches) and the thickness of 725 μm. Additionally, a release film made from PET was set on the thermosetting epoxy resin sheet for encapsulating a semiconductor. This was cured for encapsulation by vacuum compression molding using a vacuum press with the curing conditions being set to 150° C. for 300 seconds. Subsequently, the release film was delaminated, and the filling properties and the appearance were determined.

[Filling Properties]

The results are expressed as "good" when no problem occurred in filling, or as "bad" when an unfilled spot appeared, and are shown in Table 1 and Table 2.

[Appearance]

The results are expressed as "good" when the appearance was fine, or as "bad" when the appearance had a problem such as flow mark, and are shown in Table 1 and Table 2.

TABLE 1

| Fomulation of composition (parts by mass) | | | Examples | | | | | | | |
|---|---|---|---|---|---|---|---|---|---|---|
| | | | 1 | 2 | 3 | 4 | 5 | 6 | 7 | 8 |
| (A) | Epoxy resin | A-1 | 10.0 | 17.8 | 24.9 | 17.8 | 17.8 | 15.4 | 14.9 | 14.1 |
| (B) | Epoxy resin other than (A) | B-1 | — | — | — | — | — | — | — | — |
| | | B-2 | 55.0 | 44.5 | 34.9 | 44.5 | 44.5 | — | — | 42.3 |
| | | B-3 | — | — | — | — | — | 46.1 | — | — |
| | | B-4 | — | — | — | — | — | — | 44.6 | — |
| (C) | Phenol compound | C-1 | 35.0 | 37.7 | 40.3 | 37.7 | 37.7 | 38.5 | 40.5 | — |
| | | C-2 | — | — | — | — | — | — | — | 43.6 |
| (D) | Inorganic filler | D-1 | 600.0 | 600.0 | 600.0 | 1200.0 | 1200.0 | 600.0 | 600.0 | 600.0 |
| (E) | Urea-based curing accelerator | E-1 | 2.0 | 2.0 | 2.0 | 2.0 | — | 2.0 | 2.0 | 2.0 |
| | | E-2 | — | — | — | — | 2.0 | — | — | — |
| (F) | Accelerator other than urea-based one | F-1 | — | — | — | — | — | — | — | — |
| | | F-2 | — | — | — | — | — | — | — | — |

TABLE 1-continued

| Fomulation of composition (parts by mass) | | | Examples | | | | | | | |
|---|---|---|---|---|---|---|---|---|---|---|
| | | | 1 | 2 | 3 | 4 | 5 | 6 | 7 | 8 |
| (G) | Releasing agent | G-1 | 1.0 | 1.0 | 1.0 | 1.0 | 1.0 | 1.0 | 1.0 | 1.0 |
| (H) | Flame-retardant | H-1 | 10.0 | 10.0 | 10.0 | 10.0 | 10.0 | 10.0 | 10.0 | 10.0 |
| (I) | Coupling agent | I-1 | 0.5 | 0.5 | 0.5 | 0.5 | 0.5 | 0.5 | 0.5 | 0.5 |
| (J) | Colorant | J-1 | 2.0 | 2.0 | 2.0 | 2.0 | 2.0 | 2.0 | 2.0 | 2.0 |
| Evaluation Results | Initial minimum melt viscosity (Pa · s) | | 5.0 | 5.8 | 7.2 | 15.3 | 16.8 | 4.3 | 6.5 | 5.8 |
| | Minimum melt viscosity after 72 hours at 40° C. (Pa · s) | | 7.5 | 7.7 | 10.8 | 25.6 | 24.0 | 9.2 | 8.6 | 7.9 |
| | Amount of deflection (mm)/Pre-curing sheet | | 39 | 65 | >80 | 42 | 43 | 78 | 60 | 65 |
| | Formability | Filling properties | good | good | good | good | good | good | good | good |
| | | Appearance | good | good | good | good | good | good | good | good |

TABLE 2

| Formulation of composition (parts by mass) | | | Comparative Examples | | | | | | | |
|---|---|---|---|---|---|---|---|---|---|---|
| | | | 1 | 2 | 3 | 4 | 5 | 6 | 7 | 8 |
| (A) | Epoxy resin | A-1 | 63.7 | 17.8 | 17.8 | 17.8 | 17.8 | — | — | — |
| (B) | Epoxy resin | B-1 | — | — | — | — | — | 17.8 | — | — |
| | other than (A) | B-2 | — | 44.5 | 44.5 | 44.5 | 44.5 | 44.5 | 50.9 | 50.3 |
| | | B-3 | — | — | — | — | — | — | 17.0 | — |
| | | B-4 | — | — | — | — | — | — | — | 16.7 |
| (C) | Phenol | C-1 | 36.3 | 37.7 | 37.7 | 37.7 | 37.7 | 37.7 | 32.1 | 33.0 |
| | compound | C-2 | — | — | — | — | — | — | — | — |
| (D) | Inorganic filler | D-1 | 600.00 | 600.0 | 600.0 | 600.0 | 600.0 | 600.0 | 600.0 | 600.0 |
| (E) | Urea-based curing accelerator | E-1 | 2.0 | — | — | — | — | 2.0 | 2.0 | 2.0 |
| | | E-2 | — | — | — | — | — | — | — | — |
| (F) | Accelerator other than urea-based one | F-1 | — | 1.0 | — | 2.0 | — | — | — | — |
| | | F-2 | — | — | 2.0 | — | 0.5 | — | — | — |
| (G) | Releasing agent | G-1 | 1.0 | 1.0 | 1.0 | 1.0 | 1.0 | 1.0 | 1.0 | 1.0 |
| (H) | Flame-retardant | H-1 | 10.0 | 10.0 | 10.0 | 10.0 | 10.0 | 10.0 | 10.0 | 10.0 |
| (I) | Coupling agent | I-1 | 0.5 | 0.5 | 0.5 | 0.5 | 0.5 | 0.5 | 0.5 | 0.5 |
| (J) | Colorant | J-1 | 2.0 | 2.0 | 2.0 | 2.0 | 2.0 | 2.0 | 2.0 | 2.0 |
| Evaluation Results | Initial minimum melt viscosity (Pa · s) | | 15.0 | 6.0 | 6.5 | 41.2 | 6.2 | 10.8 | 3.6 | 10.1 |
| | Minimum melt viscosity after 72 hours at 40° C. (Pa · s) | | 22.6 | 40.8 | 46.5 | Cannot measured | 9.8 | 15.0 | 26.5 | 16.5 |
| | Amount of deflection (mm)/Pre-curing sheet | | Not broken | Not broken | Not broken | 65 | 65 | 16 | 41 | 10 |
| | Formability | Filling properties | good | good | good | bad | Not cured within the molding time | good | good | good |
| | | Appearance | good | bad | bad | | | good | bad | bad |
| | | Remarks | Tackiness: troublesome handling | | | | | | | |

As shown in Table 1, each of the inventive thermosetting epoxy resin sheets for encapsulating a semiconductor, used in Examples 1 to 8, showed excellent flexibility and good handleability such that the amount of deflection was 30 mm or more in an uncured state, and showed excellent storage stability and good formability such that the change of minimum melt viscosity was small after being left at 40° C. for 72 hours.

On the other hand, as shown in Table 2, Comparative Example 1 failed to obtain good handleability due to tackiness by lacking the use of the component (B). Comparative Examples 2 to 4 failed to obtain good storage stability by using an accelerator other than the urea-based one without using the component (E). In comparative 5, the sheet was not cured in the molding time due to lacking of the component (E) and smaller amount of curing accelerator other than the urea-based one. Additionally, Comparative Examples 6 to 8 failed to cope with both flexibility and formability by lacking the use of the component (A).

From the above, it was revealed that the inventive thermosetting epoxy resin sheet for encapsulating a semiconductor had excellent flexibility and good handleability in an uncured state, together with excellent storage stability and formability.

It should be noted that the present invention is not limited to the foregoing embodiments. The embodiments are just exemplification, and any examples that have substantially the same feature and demonstrate the same functions and effects as those in the technical concept described in claims of the present invention are included in the technical scope of the present invention.

What is claimed is:

1. A thermosetting epoxy resin sheet for encapsulating a semiconductor, the sheet being formed from a composition comprising:
   (A) a crystalline bisphenol A type epoxy resin,
   (B) an epoxy resin that is non-fluid at 25° C. other than the component (A),
   (C) a phenol compound having two or more phenolic hydroxy groups in a molecule thereof,
   (D) an inorganic filler, and
   (E) an urea-based curing accelerator, wherein the component (B) has a softening point measured by ring and ball method described in JIS K 7234:1986 or a melting point measured by differential scanning calorimetry (DSC) in a range of 50 to 120° C., wherein the component (D) contains a silica, wherein the component (E) is shown by the following general formula (1),

$$R^1NHCONR^2R^3 \qquad (1)$$

wherein $R^1$ represents a hydrogen atom or a group selected from an alkyl group having 1 to 18 carbon atoms and an aromatic hydrocarbon group having 6 to 18 carbon atoms, and $R^2$ and $R^3$ each represent an alkyl group having 1 to 6 carbon atoms, wherein the component (A) is contained in an amount of 10 to 25 parts by mass relative to 100 parts by mass of the total amount of the components (A), (B), and (C); and the component (E) is contained in an amount of 0.05 to 6 parts by mass relative to 100 parts by mass of the total amount of the components (A), (B), and (C), and wherein the component (D) is contained in an amount of 80 to 92 parts by mass relative to 100 parts by mass of the composition.

2. The thermosetting epoxy resin sheet for encapsulating a semiconductor according to claim 1, wherein the thermosetting epoxy resin sheet has an amount of deflection of 30 mm or more in a three-point bending test in the uncured state.

3. A semiconductor equipment, comprising a semiconductor device encapsulated with the thermosetting epoxy resin sheet for encapsulating a semiconductor according to claim 1.

4. A method for manufacturing a semiconductor equipment, comprising encapsulation of a semiconductor device by using the thermosetting epoxy resin sheet for encapsulating a semiconductor according to claim 1.

5. The method for manufacturing a semiconductor equipment according to claim 4, wherein the encapsulation of a semiconductor device is performed under pressure and/or under reduced pressure by softening or melting the thermosetting epoxy resin sheet while heating the same.

* * * * *